United States Patent [19]

Hughes

[11] 4,108,365

[45] Aug. 22, 1978

[54] COIN-OPERATED RECORDING MACHINE

[76] Inventor: Robert M. Hughes, 10009 Banyan, Alta Loma, Calif. 91701

[21] Appl. No.: 649,410

[22] Filed: Jan. 15, 1976

Related U.S. Application Data

[60] Division of Ser. No. 119,535, Mar. 1, 1971, Pat. No. 3,990,710, which is a continuation-in-part of Ser. No. 739,325, Jun. 24, 1968.

[51] Int. Cl.² ............... G06K 15/02; G06K 7/08; G06K 7/10; G11B 5/86
[52] U.S. Cl. ............... 235/419; 235/454; 235/449; 274/3; 360/15
[58] Field of Search ............... 235/61.9 R; 360/79, 360/15; 274/1 R, 3, 10 D

[56] References Cited

U.S. PATENT DOCUMENTS

| | | | |
|---|---|---|---|
| 2,908,767 | 10/1959 | Fritzinger | 360/15 |
| 3,614,394 | 10/1971 | Bindshedler | 235/61.9 R |
| 3,655,948 | 4/1972 | Spauszus | 235/61.9 R |
| 3,749,852 | 7/1973 | Moriya | 360/15 |

Primary Examiner—Daryl W. Cook
Attorney, Agent, or Firm—Boniard I. Brown

[57] ABSTRACT

Recording apparatus for "dubbing" (recording from one to the other) onto a customer's magnetic tape cartridge, selected audio and/or video recordings stored in the apparatus. The apparatus includes means for activating the apparatus, means for selecting the desired recordings, means for identifying and storing data representing the selected recordings for tabulating royalties accrued by playing the selected recordings, and magnetic tape cartridge receptacle, transport and recording means for the customer's cartridge. The record selection and recording means may be located directly on the record storage and playback machine or at a remote recording station.

3 Claims, 9 Drawing Figures

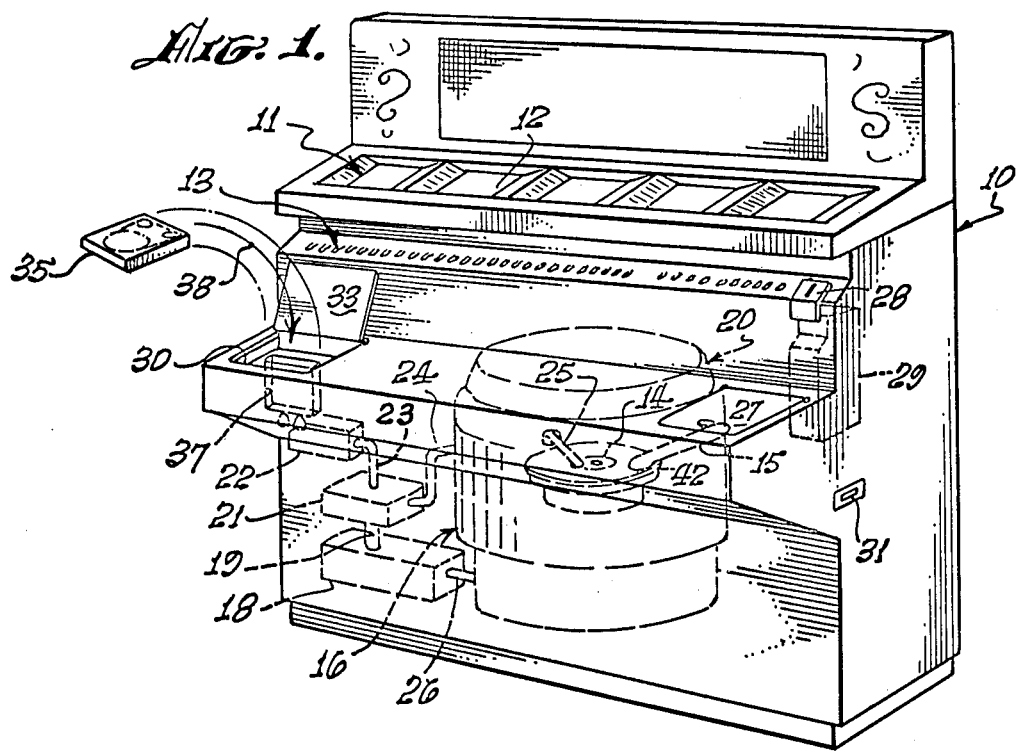
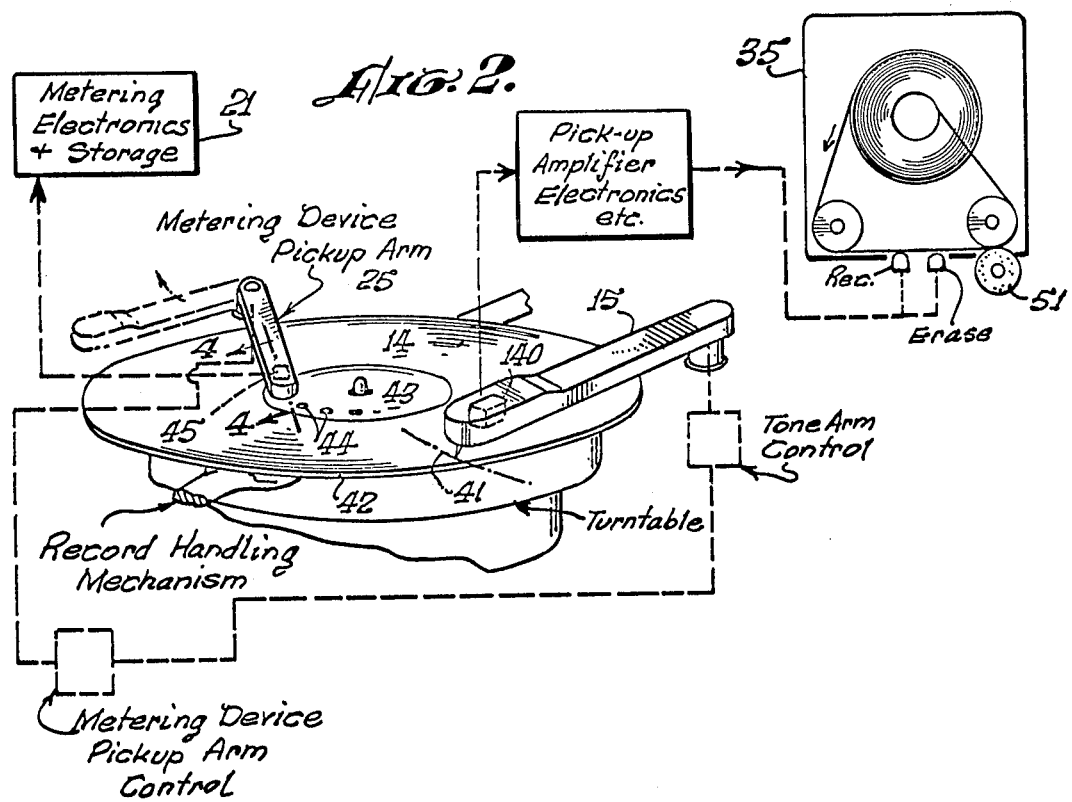

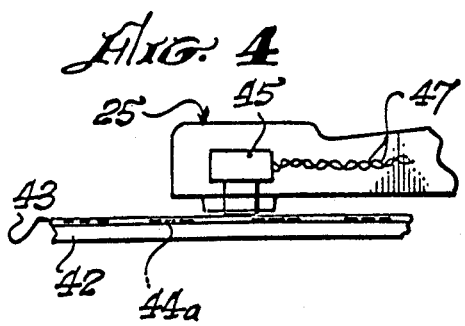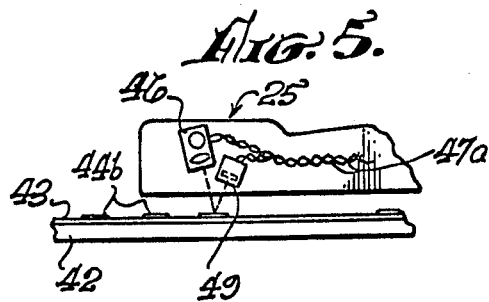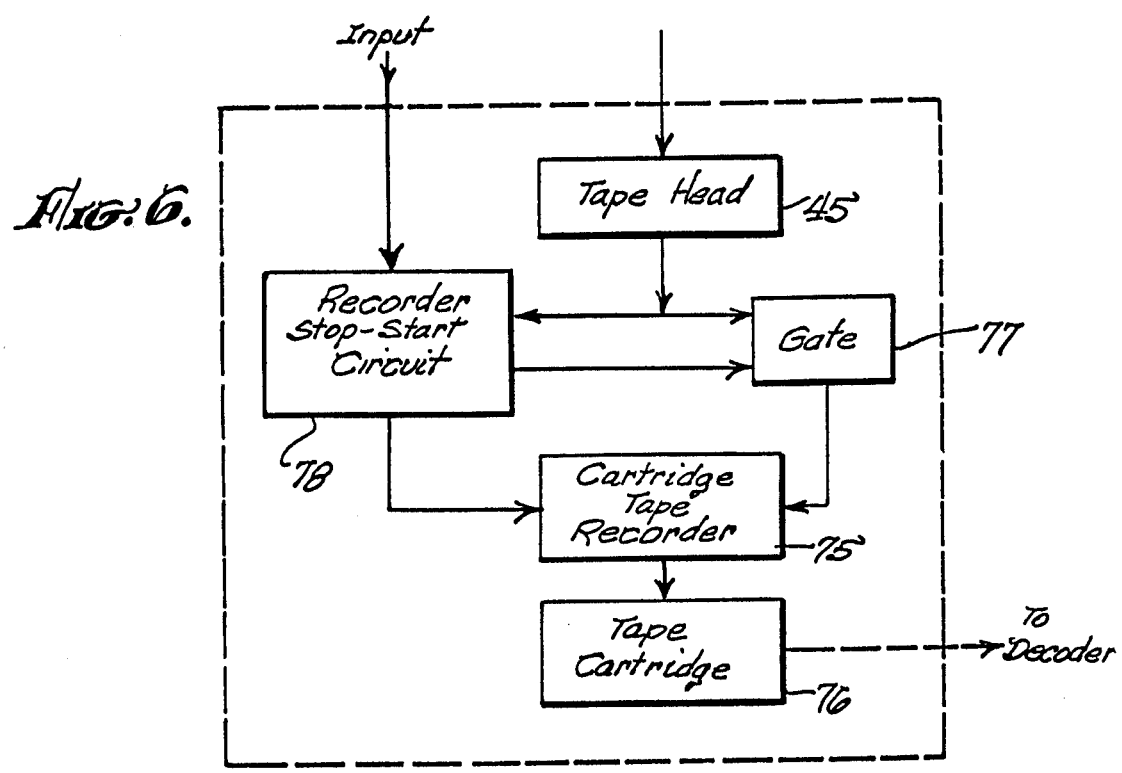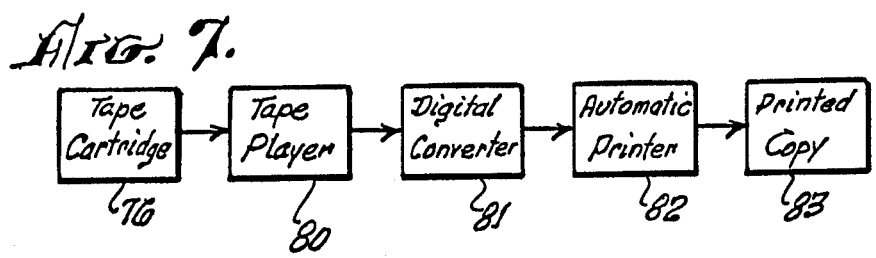

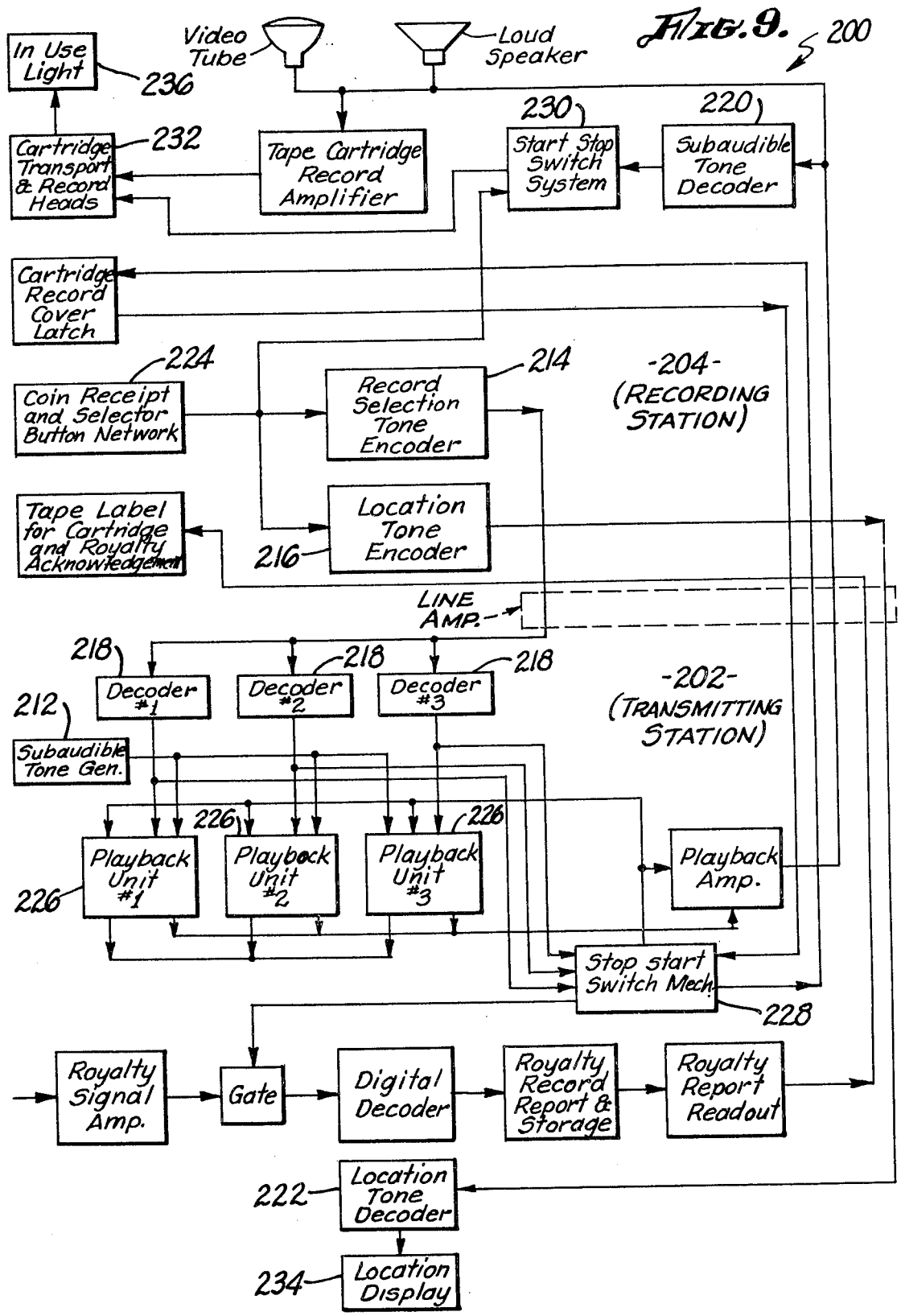

COIN-OPERATED RECORDING MACHINE

REFERENCE TO RELATED APPLICATIONS

This application is a division of application Ser. No. 119,535, filed Mar. 1, 1971, now U.S. Pat. No,. 3,990,710 entitled Coin-Operated Recording Machine, which is a continuation-in-part of application Ser. No. 739,325, filed June 24, 1968.

BACKGROUND OF THE INVENTION

1. Field of the Invention

This invention relates generally to apparatus for playing selected recordings and more particularly to apparatus of this kind which a customer may operate to play and/or record on his own magnetic tape cartridge or cassette selected audio and/or video recordings stored in the apparatus.

2. Prior Art

The stereophonic magnetic tape cartridge player is now widely used in the home and in automobiles. The owners of cartridge magnetic tape players seem inclined to favor a particular recording or group of recordings for only a relatively short time. To continually replace these recordings has two non-advantageous aspects where the owner is not a collector of the recorded music on magnetic tape cartridges. One is the expanding storage requirements for these no longer used tapes and the other is the current relatively high cost of pre-recorded cartridges.

It is therefore desirable that when one has tired of the numbers on a particular cartridge, they be replaceable at low cost and with music of the owner's choice.

One way in which this can be accomplished relatively inexpensively is to pre-record the cartridges with the new material, erasing the old recording in the process.

To accomplish this ordinarily would require a relatively costly array of apparatus for the average consumer. But if he could make such recordings at low cost, say fifty cents (50¢) or twenty-five cents (25¢) per number recorded, he would be inclined to make many substitutions replacing old with more recent recordings on his own cartridge, thus obtaining what he wants and being able to eliminate unwanted numbers.

Up to the present time, the above recording problem has existed only in the field of audio, i.e., musical, recordings. However, the introduction of magnetic video tape cassette or cartridge viewing systems for home use promises to create a similar problem, except, of course, for the much higher cost of video recording equipment. This high cost makes it even more impractical than with audio recording for the individual consumer to own the necessary recording equipment to make video recordings.

SUMMARY OF THE INVENTION

The present invention provides a coin operated recording apparatus which an individual may operate upon insertion of the appropriate coins in much the same manner as a conventional juke box to play and record on his audio or video magnetic tape cartridge any selected audio or video recording stored in the apparatus. To this end, the apparatus embodies a coin operated playback machine containing a number of audio and/or video recordings or records, record selection means such as push buttons, which the customer may actuate to select each record he wishes to record, a receptacle into which the customer may insert his magnetic cartridge, and playback - recording means for playing each selected recording and simultaneously reproducing the recording on the customer's magnetic tape cartridge. It is significant to note here that in the present disclosure, the term "record" is used as a generic descreptor covering all types of audio and video recording media which may be handled and played in a coin operated playback machine of the class described, such as audio disc records, audio tape cartridges, and video tape cartridges.

A problem which must be considered with a coin-operated device to be used by the consumer-public for recordings of this nature is the protection of the copyright owner of the music being recorded and also of the rights of artists whose performances are being thus used for business profit. They might be deprived of royalties unless each play is tabulated. According to an important and unique feature of the invention, this royalty information is tabulated or recorded automatically in the playback machine each time a record is played and recorded. To this end, each audio and video record bears data representing royalty information, such as the title of the recording, the names of the copyright owner and recording artist, the amount of the royalty, etc. The playback machine includes means for reading and tabulating the royalty data on each record as it is being played to permit periodic payment of the accrued royalties.

According to another important feature of the invention, the present recording apparatus may comprise a "juke box" like unit for installation in public facilties, such as hotels, restaurants, bars and the like, or a playback machine to be situated at a convenient central location and remote recording stations located at various public facilities. In its "juke box" form, the recording apparatus will have a console containing all of the components of the apparatus including the records to be played, the coin mechanism, record selection means, receptacle for the customer's tape cartridge, and the record playback and recording means. In its remote recording form, the recording apparatus will have a play back machine containing only means for selecting the records to be played. Each remote recording station will include a coin mechanism, record selection means, a receptacle for the customer's magnetic tape cartridge, and recording means. Each remote recording station is connected to the central playback machine by telephone lines or other electrical transmission means, whereby electrical signals may be transmitted between the machine and remote station for actuation of the machine from the station and reproduction of a recording being played in the machine on the customer's magnetic tape at the station. In this regard, it will appear from the ensuing description that operation of the recording apparatus requires transmission of control signals from each remote recording station to the central playback machine for actuating the machine to playback selected records and transmission of other control signals from the playback machine to the remote stations to actuate the recording means at the stations. According to the preferred practice of the invention, these control signals comprise multi frequency tone signals like those used in modern telephone dialing systems. The playback machine and remote recording stations are equipped with suitable decoders for detecting these tone signals.

In both forms of the apparatus, a speaker and/or video screen may be provided to permit each customer to listen to and/or watch each recording as it is being reproduced on the customer's tape cartridge. In arrangements where recording is not desired, the customer can merely listen and/or watch without recording.

BRIEF DESCRIPTION OF THE DRAWINGS

FIG. 1 is an overall view of an audio recording apparatus according to this invention showing some of the internal details of the apparatus in dashed line;

FIG. 2 shows details of the audio pickup and royalty-metering pickup arms and, in block diagram form, some of the associated apparatus to produce the copy recording and meter the operation;

FIG. 4 is a detail of the royalty metering pickup means and certain royalty data markings on records to which the metering pickup responds;

FIG. 5 is a detail similar to FIG. 4 showing an optical means for the royalty metering pickup system;

FIG. 6 is a block diagram of the stop-start and metering system of the cartridge tape recording mechanism of the invention;

FIG. 7 is a block diagram of a royalty-metering decoder system embodied in the apparatus;

FIG. 9 is a recording system according to the invention wherein the records are played at a central transmitting station and recording occurs at one or more remote recording stations.

DESCRIPTION OF THE PREFERRED EMBODIMENTS

Figure 3:
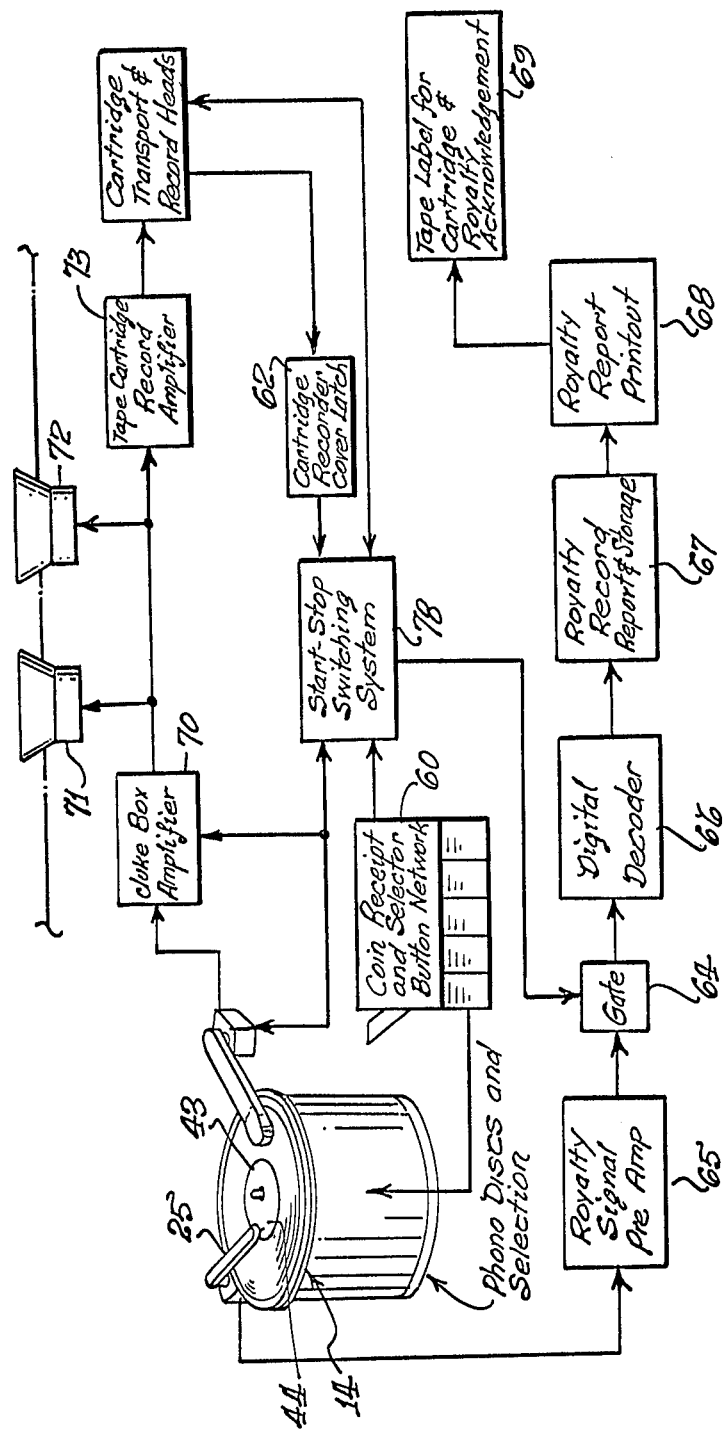
FIG. 3 is an overall block diagram of the apparatus.

The audio recording apparatus illustrated in FIGS. 1–7 is embodied in a juke-box-like console unit 10. Mounted on this unit are a push-button actuating and selection panel 11 which includes a list 12 of the recordings available for playing and recording and push buttons 13 for selecting the recordings. In this case, the records bearing the audio recordings are conventional phonograph discs.

In general for the purpose of this invention, certain modifications will be necessary in the usual juke box type of automatic coin-operated phonograph record disc player. These changes will be in the amplifier output connections to a magnetic tape cartridge recorder, in a number of switching connections relating to the stopping and starting of the tape cartridge recorder, and in the inclusion of a pickup means in addition to the standard phonograph pickup. The added pickup means, while physically similar to the phonograph record pickup, will differ in that its cartridge will be either a magnetic sensor or a photoelectric sensor with an appropriate light source. Further, all of the records for use with the recording means of this invention will have to be modified to include either magnetic indicia printed on the label or a set of indicia markings printed in ordinary light and dark gradations. The new pickup will sense these indicia markings.

Shown in dashed lines within the unit 10 is the record playing selection and magazine mechanism 20 including a conventional turntable 14 and a conventional tone pickup arm 15. The magazine 14 stores the records. The mechanism which selects the records and delivers them, upon pressing buttons on panel 11, to the turntable, is within the housing in the dashed-line assembly 20. An electronic audio equipment assembly 18 includes the conventional reproducing amplifiers for a juke box. The amplifier is modified to have an output 19 which passes through a metering electronics package 21 to the recording amplifier and electronics package 22 via a connection 23. A cable connection 24 extends from the turntable assembly to the metering electronics box 21 to bring signals from a metering pickup 25, further described below, to the metering electronics box 21. Another cable connection shown at 26 brings the signals from the tone arm pickup 15 to the reproducing amplifier 18.

A coin-receiving slot 28 and associated collection box 29 with an associated coin-return slot 31 are shown in the unit 10. The cabinet of the unit has two recorder and magnetic tape cartridge-receiving compartments 27 and 30. The cover 33 of compartment 30 is shown open with a cartridge-receiving slot 37. A typical magnetic tape cartridge is shown at 35 removed from the slot 37 over the path shown by arrow 38.

In FIG. 2, the components are shown semi-schematically and in block form since many of these components are conventional. The pickup 15 includes a pickup cartridge 40 with a stylus 41 that rides in the grooves of a record 42 on turntable 14 in the conventional fashion. The signals derived from the disc record are entirely conventional and are applied to the reproducing amplifier electronics package 18 in the well known manner.

On the label 43 of the record 42 appear markings 44 which may be printed or embossed light and dark areas of pre-arranged shapes or marks in various positions, or they may be magnetic markings of appropriate configurational or digital patterns or density variations. The markings are coded to provide royalty data representing the record 42 being played. The data markings can occupy a single revolution on the disc label, or several revolutions, or may for particular purposes encompass an entire disc.

As can be seen in FIGS. 4 and 5, the markings 44a and 44b will produce signals when in proximity to metering pickup device 25. If FIG. 4 is considered, the markings 44a are of magnetic configuration. If FIG. 5 is considered, the markings 44b are light and dark imprints or embossings or the like.

To pick off the magnetic markings, a magnetic pickup or sensor 45 is provided in arm 25 with leads 47 that are connected to package 21 of FIG. 3. Similarly, if FIG. 5 is considered, the arm 25 has an optical light source 46 directed at markings 44b and a photoelectric pickup 49 which senses the light and dark areas of the markings 44b to produce a signal applied on leads 47a to package 21. It should be understood that the magnetic and photoelectric techniques are alternative methods of obtaining the coded signal information from the code markings 44, 44a or 44b to identify the record being played. The coded signals are applied to the metering electronics and storage package 21 (FIG. 2) either from the magnetic head 45 or photoelectric pickup 49.

The tape cartridge 35 to be recorded (as shown in FIG. 2) is illustrated as a continuous loop cartridge, like the unit identified by the trade style FIDELIPAC. Reel-to-reel cartridges may be used as well. In any case, the mechanism which does the recording and accepts the cartridges will operate in conventional fashion, but will be subject to controls responsive to the coin-operated mechanism and appropriate means to start the capstan drive (as indicated at 51 in FIG. 2).

The customer's cartridge 35 is placed in slot 37. The cover 33 is closed over the cartridge slot and this activates a solenoid lock, to be discussed below, which prevents the cover from being opened during the recording interval so that the customer may leave the area while his cartridge is being dubbed.

After the appropriate coins have been inserted in coin slot 28, electrical contacts are made which effect placement of the selected record 42 on the turntable 14. Thereafter, the metering device pickup arm 25 is moved over the markings 44 (or 44a or 44b) on label 43 so that sensor 45 (or 49) may respond to the markings on the label 43 during the first revolution of the record 42 on turntable 14. The phonograph pickup arm 15 is moved into place on the record 42 at the same time to begin playing the record while the magnetic tape cartridge recorder capstan is started to complete the recording of the disc 42 to the tape cartridge 35.

When the recording is completed, the cover latching mechanism is released to permit opening the cover to remove the now recorded cartridge.

It should be clearly understood that the recordings can be either monophonic or stereophonic, but it is conventional that the cartridges to be recorded will be of the stereo type. It should be further understood that either 8-track or 4-track cartridges can be recorded by the system of this invention. For this reason, the usual arrangement of the coin-operated system of this invention will include pre-selection means for two, three, four, or more stereophonic records to be recorded in sequence on the tape. However, there is no reason why a system according to the invention cannot also include three more turntable assemblies such as 14, each being supplied by the same storage mechanism 16.

Since records have two sides and there is the possibility of one desiring to record each side of the same record, the selection means 11 is equipped to cause the system to play the desired numbers sequence. The record is turned over after the first side selected is played. Some of the juke box devices are capable of playing either side on selection. In these machines, the disc is upright and there are pickups on either side to operate for playing the selected record.

Referring now to FIG. 3 which presents an overall block diagram of the system of this invention, it can be seen that the coin-operated selection and control system 60 can be used to set the system in motion by operating the record stack distribution and selection system of the juke box to place the selected record on the turntable 14. The operation of the dropping of the phonograph playback arm 15 and metering device arm 25 can be arranged to be delayed by the stop-start circuit 78 until the consumer has placed his cartridge 35 into the slot 37 of FIG. 1, and the cover 33 of the cartridge receptacle area has been closed and latched by latching relay system 62. When all these events have occurred, the stop-start switch 78 can be release the playback and metering device arm 15, 25 onto the record 42 and the recording can begin. At some point during the revolution of the turntable 14, a gate 64 will be enabled so that the output of pickup 25 now reading the markings on label 43 and always present in amplifier 65 may be transmitted through gate 64 to a digital decoder 66 which will enter the appropriate signals into the royalty report storage means 67 which can be a memory bank of cores or pre-set flip-flops which will respond to the series of digital signals to generate control signals for a printout device 68 which will in turn print a royalty record identifying the record played and the organization or individual to whom royalties are due, and how much. A tone signal on the label 43 (in the markings 44) may be used as an enabling pulse for gate 64. It is sensed by pickup 25. The printout can also be adapted to provide an adhesive label, as at 69, for the cartridge identifying the title, artist and source, and indicating that a royalty has been paid, along with a date and such other significant data as may be desired, or necessary, or legally required.

It should be clear that information retrieval such as described above is possible from entirely magnetically or optically recorded discs sensed by pickups such as shown in FIGS. 4 and 5.

Much of the printout data and label-generating information can be in the form of coded characters or symbols, as where record manufacturer source is to be identifed and so forth.

When the turntable pickup 15 for the phonograph record 42 reaches the sound recorded portion of the record, the juke box amplifier 70 reproduces the signal via loud speakers 71, 72, and at the same time applies a proportionate signal to the tape cartridge record amplifier 73 which drives the tape cartridge transport and tape head system 74 to make a recording on the magnetic tape in the cartridge 35 within the compartment 74. Means can be provided to switch the speakers off, if so desired. At the conclusion of the selected record, the stop-start switching system 78 disengages gate 64 to await a newly selected recording placed on the turntable.

It should be clearly understood that items 25, 65, 66, 67, 68 and 69 may have many applications outside of the specific royalty record use hereinabove described because in many areas, a record of an event, or a series of events, maybe encoded, recorded and reported in a similar fashion. These events may be derived from the passage of a magnetically read or optically read card through a slot, as may be employed in an inventory control system or in any pre-paid operation or credit system. The card could even be impressed with a new coded signal train after each use to signify its useability for a subsequent event, or cancel the precedent code recording when it has been used, as in a pre-paid meal ticket such as used by college or other food commissaries. The record of uses of the cards and amounts charged can be read out or printed out as described above, or below in later portions of this specification.

Referring now to FIG. 6, a block diagram is shown of one way in which the recording of data may be accomplished for the royalty reporting feature of this invention.

It will be assumed that a tape cartridge recorder 75 with a cartridge 76 inserted is provided on which to keep a record of the disc recordings which have been dubbed and pair for.

A device comparable to a tape pickup head 45 is provided in the arm 25 as suggested in FIG. 4.

A gate circuit 77 responds to a characteristic code indicia 44a on the label 43 pickup by tape head 45 which also is associated with the recorder stop-start circuit (see also FIG. 3) and starts the royalty record recorder 75 going to record the indicia information on tape 76 about the disc record to be duplicated onto a cartridge 35 or any other information to be recorded.

On a later occasion, the tape cartridge 76 can be played back into a decoder system as shown in FIG. 7, to perform the operation of printout of the information regarding royalties as previously described, to provide a printed copy of the royalty information. The tape cartridge 76 can be replaced by a magnetically recorded disc similar to the label portion 43 of disc 42. The cartridge 45 in arm 25 can be modified in known fashion to make it record on a magnetic surface from date sources externally provided.

In FIG. 7, the tape cartridge of the decoder system would be inserted in a decoding tape player 80 which would apply signals to a digital converter 81 to operate automatic printer 82 so that a printed copy 83 of the royalty report could be produced.

There has been described hereinabove a system for duplicating onto magnetic tape cartridges the disc recordings found on juke box records in a coin-operated automatic record player.

The new system includes means to receive a cartridge of magnetic tape and to record thereon the music or performance on one of the phonograph records selected by the owner of the cartridge to be recorded thereon.

The system includes means for sensing and recording the fact of this duplication of the performance so that an accounting can be made on the royalties due the artist, the manufacturer of the record, and/or the copyright owner of the music or material being performed.

An aspect of the operation of the system of this invention is its use as an information retrieval system. An information retrieval system encompasses a source of data which is recorded on a medium (punched tape, magnetic tape, magnetically recorded discs, or in any other form), a means for detecting the recorded data, and an electronic circuit assembly of some kind to process the data detected so as to collect the recorded information on a pre-selected basis and utilize the collected data.

As used in this invention, the medium is a label such as 43 containing indicia 44 as indicating in FIGS. 2 and 3.

However, the entire record may be a magnetically recorded information or data stream from which the user can select material to be recorded onto a tape cartridge. In such an instance, pickup 15 will be an appropriate sensor to detect the magnetic recording on the disc.

An example of such a use is in a legal office where the storage bank of data might be of various volumes of law reports and court reporter data with superimposed digital information signals such that particular portions of the report may be selected and recorded for use by a secretary in preparing a brief.

Figure 8:
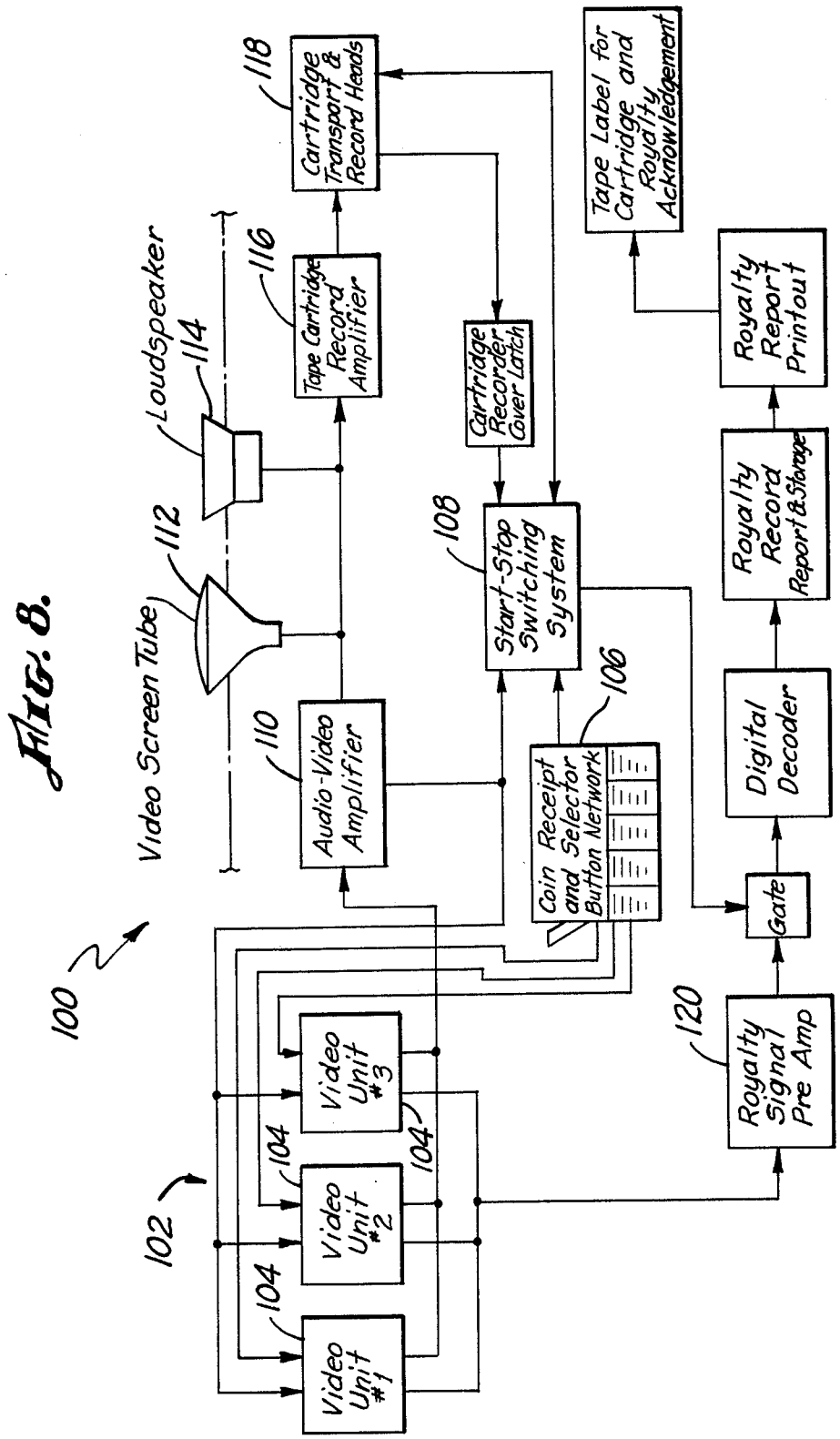
FIG. 8 is a video recording system according to the invention.

FIG. 8 illustrates, in block diagram fashion, a video recording apparatus 100 according to the invention. As is readily evident from a comparison to FIGS. 3 and 8, the video recording apparatus is identical to the audio recording apparatus except for replacement of the disc record playback mechanism of the audio apparatus by a video play back mechanism 102. This video playback mechanism includes a number, in this instance three, video playback units 104 containing different video recordings on magnetic tape. The video units are connected to the record selection means 106 and switching means 108 for initiation of operation of a selected unit by depression of the corresponding button or buttons of the selection means. The audio and video outputs from the audio and video pickup heads in the units are fed to an audio-video amplifier 110, the output of which feeds a video tube 112 and loud speaker 114 for reproducing the recorded video picture and sound and a tape cartridge record amplifier 116. Amplifier 116 feeds the amplified audio and video signals to the record heads of the tape cartridge record mechanisms 118, which, in this case, is an audio-video record mechanism for receiving a conventional video tape cartridge. In this video system, the royalty information or data is recorded on the magnetic tape in each video unit and is read out by an appropriate pickup head and fed to a royalty signal amplifier 120 during replay of the respective tape. The remainder of the video recording system is essentially the same as the earlier described audio recording system.

Operation of the video recording system is essentially the same as the audio recording system and hence need not be repeated in elaborate detail. Suffice it to say that insertion of the proper coin or coins into the coin slot and depression of a selected button of the record selection means 106 actuates the corresponding video playback unit 104. The audio and video signals from the unit are fed to the video playback unit 112, loud speaker 114 and recording means 118 to present to the customer the audio-video recording being played and simultaneously reproduce the recording on the customer's magnetic tape. The royalty information on the video recording is tabulated while the recording is being played. It will be readily appreciated that the selected fiscal or audio presentation may be loaned to and/or watched at the remote location without recording, if desired.

FIG. 9 illustrates a modified recording apparatus 200 according to the invention having a transmitting station 202 where the audio and/or video records are stored and played and remote recording stations 204 (only one shown) where the recordings are actually reproduced on customers' magnetic tapes. The transmitting station may be situated at any convenient central location, and the recording stations may be located in selected public facilities, private houses, and the like. The transmitting and recording stations are linked by telephone lines or other signal transmission means for transmitting electrical signals representing a recording being played to the recording stations where the signals are applied to the record heads of the cartridge recording means. The recording apparatus of FIG. 9 is basically similar to those of FIGS. 1–8 except for the widely separated locations of the record storage and playback means and the cartridge recording means the the inclusion, in the recording apparatus of FIG. 9, of certain additional tone encoding and decoding functions which are necessary to permit selection of records and actuation of the record playback means from the recording stations and actuation of the cartridge recording means from the transmitting station. Accordingly, it is unnecessary to describe the apparatus 200 in complete detail. With regard to the separated locations of the transmitting and recording stations, it is significant to note that the various components of the record playback means at the transmitting station and cartridge recording means at the recording station are shown as being linked by separate electrical transmission lines 206 in order to more clearly illustrate the operation of the recording apparatus. In actual practice, however, the transmitting and recording station will be linked by a telephone or other line which will carry all of the electrical signals that occur during operation of the apparatus. These signals are amplified by one or more line amplifiers 208, as necessary.

With the foregoing discussion in mind, it will be observed that aside from the separated locations of the transmitting and recording stations 202, 204, the recording apparatus 200 is identical to that of FIG. 8 except for the addition of a tone generator 212, tone encoders 214, 216, and tone decoders 218, 220, 222. Such tone encoders and decoders are well known in the art and thus need not be explained. Suffice it to say that tone encoder 214 is a record selection tone encoder which is actuated by operation of the record selection means 224 to select a record to be played and produces a tone or a combination of tones representing the selected record. This tone signal is fed to the tone decoders 218, each of which is responsive only to the tone signal representing its respective record. The responsive decoder 218 actuates its respective playback unit 226 and the playback start-stop switch means 228 to play the recording stored in the unit.

Tone generator 212 is a subaudible tone generator which feeds to the playback units 226 a subaudible fixed frequency tone that is impressed on the output of the units during their playback operation. This subaudible tone continues during the entire length of each recording and is detected by the tone decoder 220 at the recording station 204. Decoder 220 actuates the recording station start-stop switch means 230 in response to the subaudible tone to effect operation of the tape cartridge recording means 232 for reproducing on a customer's magnetic tape cartridge the recording being played at the transmitting station 202. The subaudible tone closes at the conclusion of the recording to terminate operation of the cartridge recording means 232.

The tone encoder 216 is a location tone encoder which is actuated by operation of the record selection means 224 to select a record to be played and produces a tone or combination of tones representing or identifying the recording station. This tone signal is fed to the decoder 222 at the transmitting station. Decoder 222 actuates a display 234 which registers the location of the recording station at which the tape cartridge is being recorded.

It will now be understood that the recording apparatus 200 operates in essentially the same manner as that of FIG. 8 except that a customer inserts his tape cartridge into the apparatus and selects a record at one of the recording stations 204, while actual playback of the recording occurs at the transmitting station 202. In this regard, it will be recalled that the recording apparatus 200 may have a number of recording stations serviced by one central transmitting station. The recording stations, for example, may be located in homes and other dwellings, such that the occupants may record new programs any time they wish to simply by inserting the appropriate coins into the apparatus. It should again be noted that the selected program paid for by the user is not necessarily recorded but can be only listened to and/or watch without recording.

In the particular recording apparatus shown, all of the cartridge recorder covers are latched closed during operation of the apparatus so that customers may have to wait to record. Each recording station 204 has a signal light 236 to indicate that the system is in operation. It is obvious, of course, that the system could be modified to permit recording at any recording station at any time, regardless of whether or not a recording was being made at another recording station.

It will also be obvious that the playback units 226 may be audio and/or video playback units of any type.

The inventor claims:

1. In a recording apparatus:
    records adapted to be selectively reproduced in said apparatus for producing corresponding recordings,
    said records having digital signal-identifying indicia thereon,
    an automatic record-keeping apparatus for sensing said digital signal indicia on each record being reproduced to identify the recording being made, and
    an indicating apparatus coupled with said record-keeping apparatus including means to print a record of the recordings made.

2. A recording apparatus as defined in claim 1, wherein each has a label, and the digital signal-identifying indicia of the record comprises magnetic characters imprinted on the label, and
    the record-keeping apparatus includes a magnetic pickup responsive to said magnetic characters.

3. A recording apparatus as defined in claim 1, wherein each record has a label, and the digital signal-identifying indicia of ther record comprises light and dark characters imprinted on the label, and
    the record-keeping apparatus includes a light source for illuminating said indicia and a photoelectric cell responsive to the reflections from said light and dark imprinted characters.

* * * * *